(12) United States Patent
Lee et al.

(10) Patent No.: US 9,703,593 B2
(45) Date of Patent: Jul. 11, 2017

(54) APPARATUS AND METHOD FOR MEMORY OVERLAY

(71) Applicant: Samsung Electronics Co., Ltd., Suwon-si (KR)

(72) Inventors: Jae Don Lee, Paju-si (KR); Seung Won Lee, Hwaseong-si (KR); Chae Seok Im, Suwon-si (KR); Shi Hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/733,455

(22) Filed: Jan. 3, 2013

(65) Prior Publication Data

US 2013/0205298 A1    Aug. 8, 2013

(30) Foreign Application Priority Data

Feb. 6, 2012 (KR) .................. 10-2012-0011737

(51) Int. Cl.
| | | |
|---|---|---|
| *G06F 12/00* | (2006.01) | |
| *G06F 9/46* | (2006.01) | |
| *G06F 13/00* | (2006.01) | |
| *G06F 13/28* | (2006.01) | |

(52) U.S. Cl.
CPC .............. *G06F 9/46* (2013.01); *G06F 9/461* (2013.01)

(58) Field of Classification Search
CPC ...................................... G06F 9/461
USPC ................................. 711/143, 144
See application file for complete search history.

(56) References Cited

U.S. PATENT DOCUMENTS

| | | | | |
|---|---|---|---|---|
| 4,654,819 A | * | 3/1987 | Stiffler | ................ G06F 11/1435 |
| | | | | 711/162 |
| 5,727,211 A | * | 3/1998 | Gulsen | .......................... 718/108 |
| 6,145,071 A | * | 11/2000 | Berkovich et al. | ............. 712/18 |
| 6,314,510 B1 | * | 11/2001 | Saulsbury | ............... G06F 9/463 |
| | | | | 711/145 |
| 6,367,005 B1 | * | 4/2002 | Zahir et al. | .................... 712/228 |
| 6,453,365 B1 | | 9/2002 | Habot | |
| 6,931,495 B2 | | 8/2005 | Nakada | |
| 2002/0108025 A1 | * | 8/2002 | Shaylor | ......................... 711/203 |
| 2002/0188771 A1 | | 12/2002 | Kagemoto | |
| 2004/0267855 A1 | * | 12/2004 | Shantz | .................. G06F 7/5324 |
| | | | | 708/523 |
| 2005/0010743 A1 | * | 1/2005 | Tremblay | ............... G06F 9/3001 |
| | | | | 712/10 |
| 2007/0266374 A1 | * | 11/2007 | Grisenthwaite | ....... G06F 9/3861 |
| | | | | 717/127 |

(Continued)

FOREIGN PATENT DOCUMENTS

| | | |
|---|---|---|
| JP | 05-189307 | 7/1993 |
| JP | 2006-254437 | 9/2006 |

(Continued)

*Primary Examiner* — Mark Giardino, Jr.
(74) *Attorney, Agent, or Firm* — Sughrue Mion, PLLC

(57) ABSTRACT

A memory overlay apparatus includes an internal memory that includes a dirty bit indicating a changed memory area, a memory management unit that controls an external memory to store only changed data so that only data actually being used by a task during overlay is stored and restored, and a direct memory access (DMA) management unit that confirms the dirty bit when the task is changed and that moves a data area of the task between the internal memory and the external memory.

16 Claims, 7 Drawing Sheets

(56) References Cited

U.S. PATENT DOCUMENTS

2009/0172298 A1\* 7/2009 Yoon .................. G06F 9/45537
711/144

FOREIGN PATENT DOCUMENTS

| KR | 10-2004-0019451 | 3/2004 |
| KR | 10-2007-0060854 | 6/2007 |
| KR | 10-2010-0050108 | 5/2010 |

\* cited by examiner

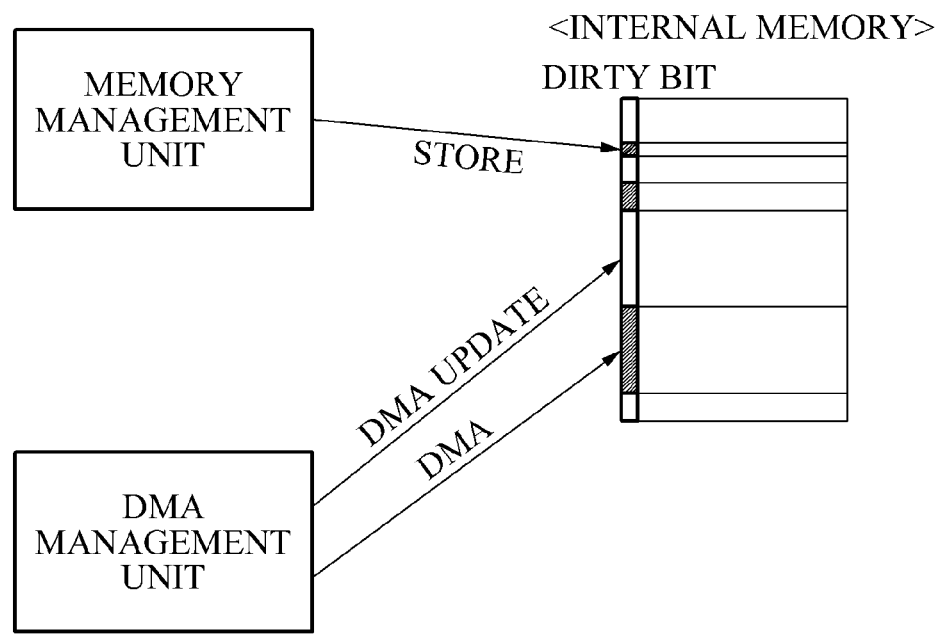

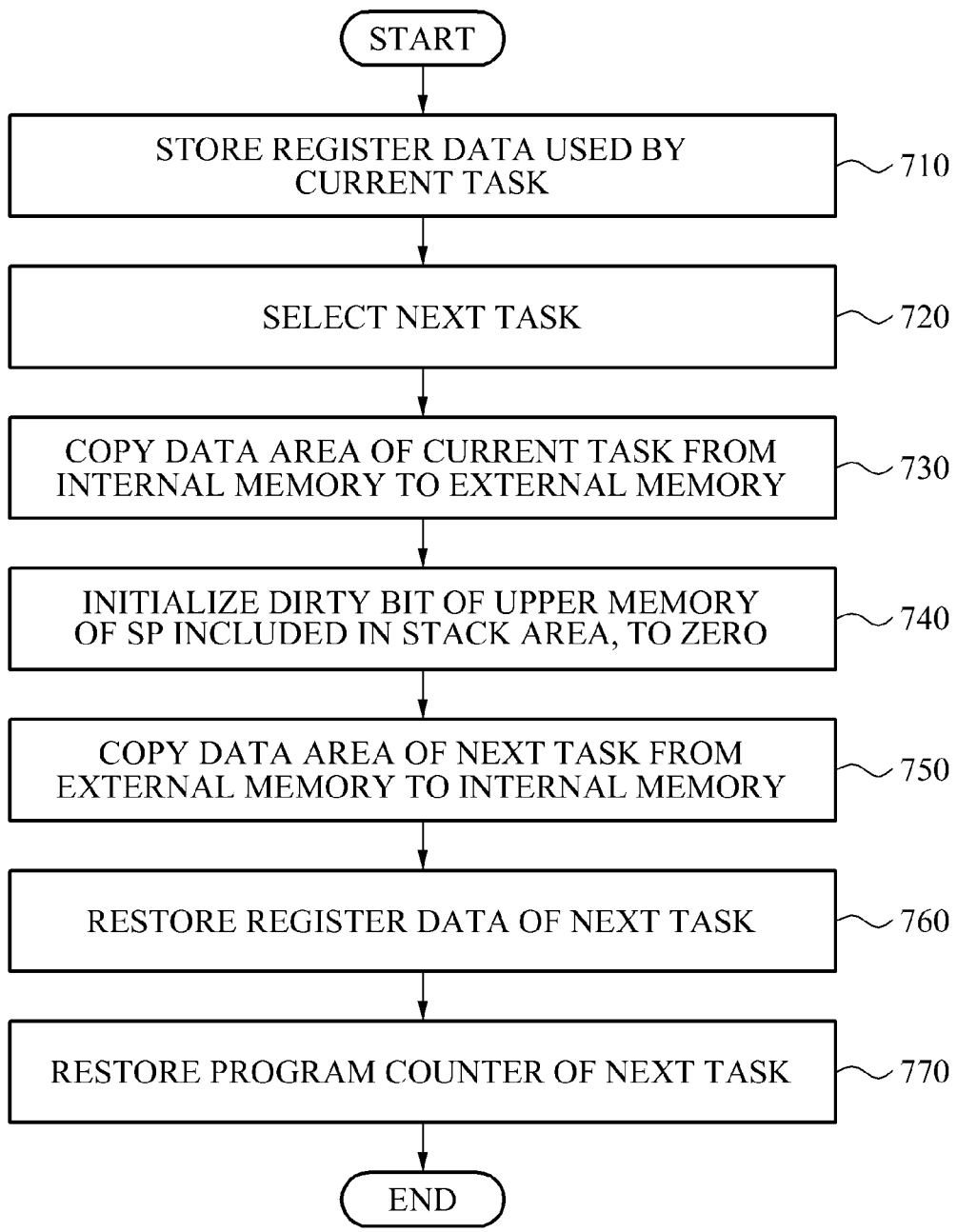

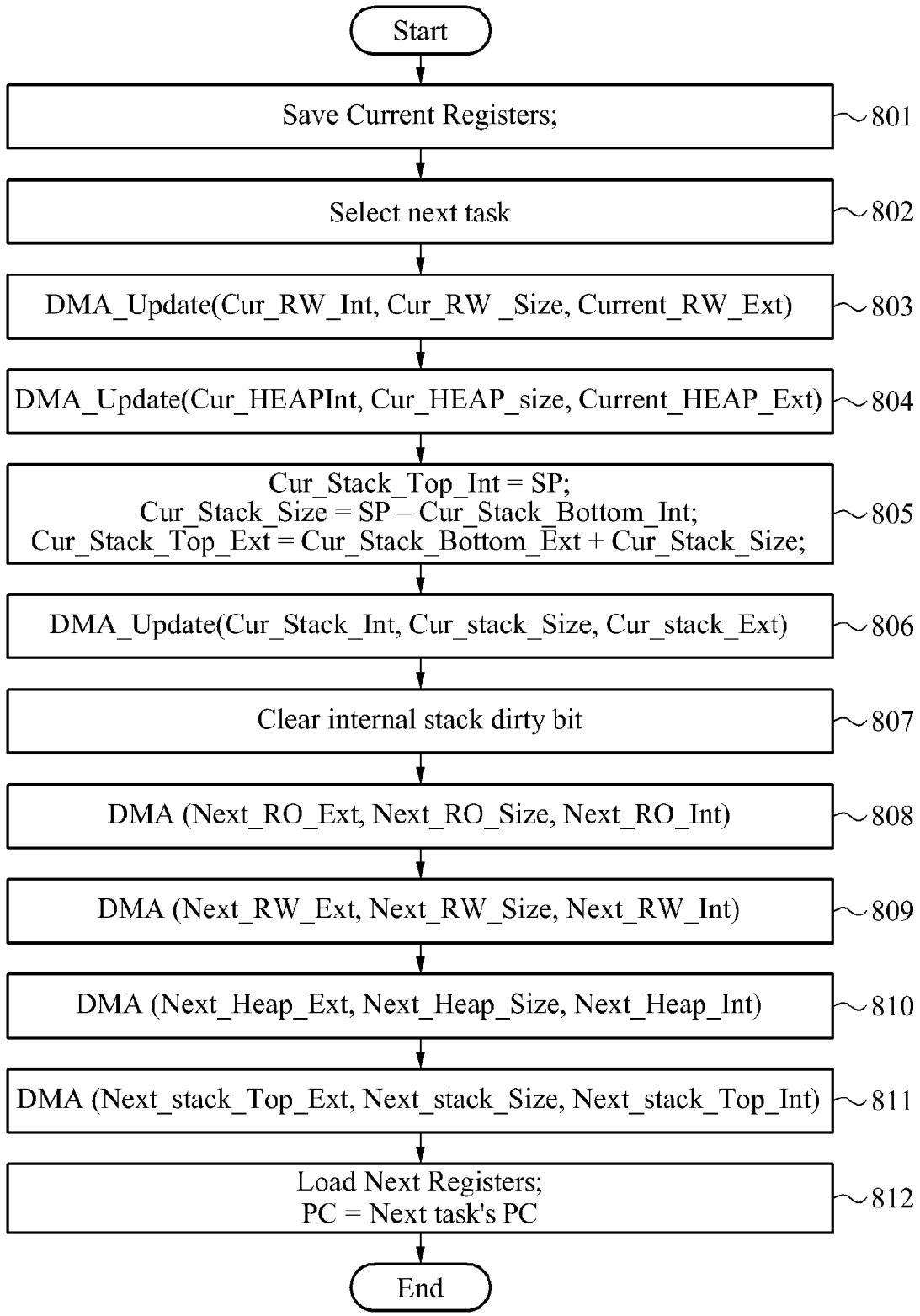

APPARATUS AND METHOD FOR MEMORY OVERLAY

CROSS-REFERENCE TO RELATED APPLICATIONS

This application claims the priority benefit of Korean Patent Application No. 10-2012-0011737, filed on Feb. 6, 2012, in the Korean Intellectual Property Office, the disclosure of which is incorporated herein by reference.

BACKGROUND

1. Field

The following description relates to an apparatus and method for memory overlay in a multitasking system.

2. Description of the Related Art

As a function of a processor quickly develops and complexity of an application program also rapidly increases, a multitasking technology is being applied to process several tasks in one processor simultaneously, and thus, increases a use rate of the processor.

Generally, a computer system uses a hierarchical memory array structure.

In the memory array structure, a memory disposed close to a central processing unit (CPU) is fast, but has a relatively small capacity and is expensive. Conversely, a memory disposed far from the CPU is slow, but has a relatively large capacity and is inexpensive.

Thus, although an internal memory is superior to an external memory in terms of data processing, it may increase a cost of the system when the system includes several internal memories.

Accordingly, when a small-sized internal memory is efficiently shared in various tasks, a high performance of the system may be achieved.

Recently, in an embedded system, a high-speed internal memory called a scratch pad memory is being used, at a greater rate, for data processing.

An overlay scheme, instead of a virtual memory scheme, is widely used in the embedded system for sharing of the high-speed internal memory.

However, the virtual memory scheme induces a high cost for necessary paging hardware and is difficult to apply in a real-time computing system.

SUMMARY

The foregoing and/or other aspects are achieved by providing a memory overlay apparatus including an internal memory that includes a dirty bit indicating a changed memory area, a memory management unit that controls an external memory to store only changed data so that only data actually being used by a task during overlay is stored and restored, and a direct memory access (DMA) management unit that confirms the dirty bit when the task is changed and that moves a data area of the task between the internal memory and the external memory.

A stack area of the task may include an area from an address indicated by a stack pointer (SP) register during the overlay to a lowermost address to which the dirty bit is set in the stack area, and is stored from the internal memory to the external memory.

A stack of a task restored during the overlay may include an area from an address indicated by an SP register of a task subsequent to a bottom of the stack, and is restored from the external memory to the internal memory.

The task area may store data from the internal memory to the external memory using the dirty bit.

A next task area may be totally restored from the external memory to the internal memory.

The memory management unit may set a dirty bit of an address in which the data is to be stored to one when storage of the data is commanded.

The DMA management unit may perform DMA from the internal memory to the external memory such that only data of an address to which the dirty bit is set is copied to the internal memory.

The DMA management unit may initialize a dirty bit of a task of which the data is copied to zero when the data is copied.

The foregoing and/or other aspects are achieved by providing a memory overlay method including maintaining an internal memory that includes a dirty bit indicating a changed memory area; controlling an external memory to store only changed data so that only data actually being used by a task during overlay is stored and restored; and confirming the dirty bit when the task is changed; and moving a data area of the task between the internal memory and the external memory.

The memory overlay method may further include setting a dirty bit of an address in which the data is to be stored to one when storage of the data is commanded.

The memory overlay method may further include performing direct memory access (DMA) from the internal memory to the external memory such that only data of an address to which the dirty bit is set is copied to the internal memory.

The memory overlay method may further include initializing a dirty bit of a task of which the data is copied to zero when the data is copied.

The foregoing and/or other aspects are also achieved by providing a memory overlay method including storing register data being used by a currently performed task when a context switch occurs; selecting a task to be performed next; copying a data area of the currently performed task from an internal memory to an external memory; initializing a dirty bit of an upper memory of a stack pointer (SP) included in a stack area to zero; copying a data area of a task to be performed next from the external memory to the internal memory; and restoring register data of the task to be performed next.

The memory overlay method may further include restoring a program counter of a task to be performed next.

The foregoing and/or other aspects are also achieved by providing a multitasking system to manage sets of task data, where each set is associated with a respective task, and the system includes: an internal memory including a plurality of data addresses to store the task data, wherein each address includes a respective flag bit; an external memory; a direct memory access management unit to store task data from the internal memory to the external memory, and restore task data from the external memory to the internal memory; and a memory management unit to initialize each flag bit to a first state when task data is stored, and set the respective flag bit to a second state when task data is changed, by the respective task, in the data addresses in the internal memory, wherein the direct memory access management unit stores data only from the addresses with the respective flag bit value set to the second state.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 4 illustrates an operational structure of a memory overlay apparatus, according to example embodiments;

FIG. 5 illustrates an example of a memory storage command, according to example embodiments;

FIG. 7 illustrates a memory overlay method, according to example embodiments; and FIG. 8 illustrates a process of a context switch, according to example embodiments.

DETAILED DESCRIPTION

Figure 1:
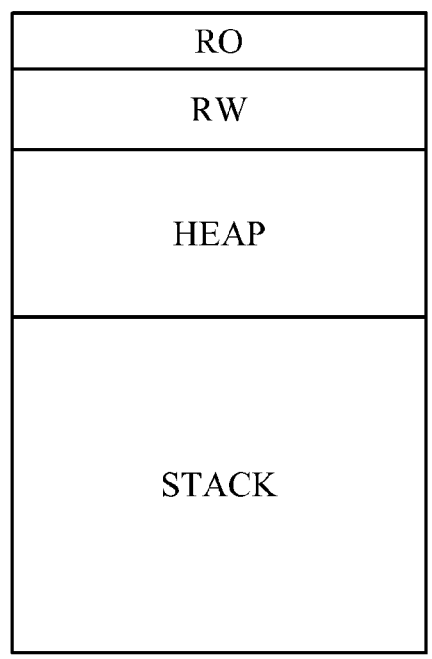
FIG. 1 illustrates an example of classification of a data area of a task, according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

In the following description, if detailed descriptions of related disclosed art or configuration are determined to unnecessarily make the subject matter of the description obscure, they will be omitted. Terms to be used below are defined based on their functions in the description and may vary according to users, user's intentions, or practices. Therefore, the definitions of the terms should be determined based on the entire specification.

FIG. 1 illustrates an example of classification of a data area of a task, according to example embodiments.

Referring to FIG. 1, a memory overlay apparatus according to example embodiments may use a data area of a task in a classifying manner.

For example, a read only (RO) area of a task refers to an area storing data which is readable but not writable.

A read and write (RW) area of the task refers to a data area capable of both reading and writing.

A heap area of the task refers to a data area dynamically allocated to a user.

A stack area of the task refers to an area for an automatic variable defined in a function.

Figure 2:
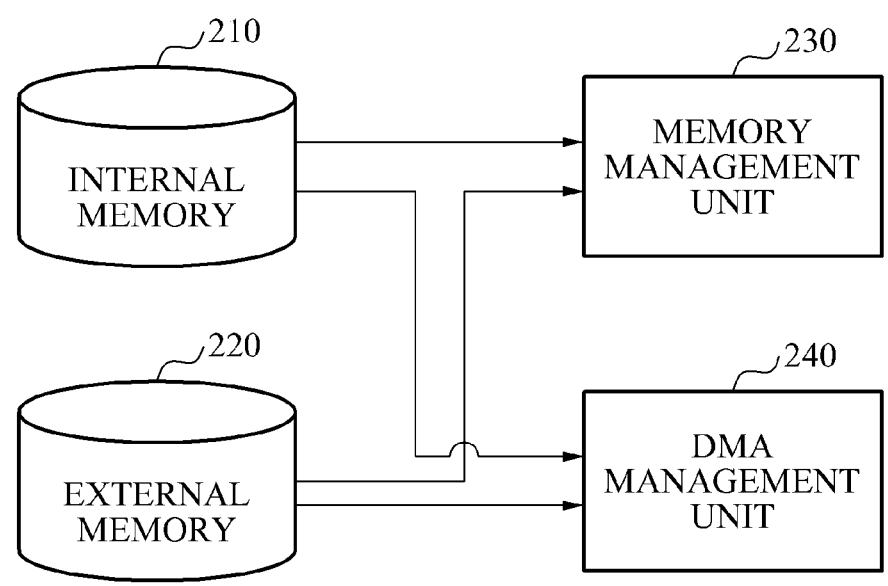
FIG. 2 illustrates a structure of a memory overlay apparatus, according to example embodiments.

FIG. 2 illustrates a structure of a memory overlay apparatus according to example embodiments.

Referring to FIG. 2, the memory overlay apparatus may include an internal memory 210 that includes a dirty bit indicating a changed memory area, a memory management unit 230 that controls an external memory 220 to store only changed data so that only data actually being used by a task during overlay is stored and restored, and a direct memory access (DMA) management unit 240 that confirms the dirty bit when the task is changed and moves a data area of the task between the internal memory 210 and the external memory 220.

Figure 3:
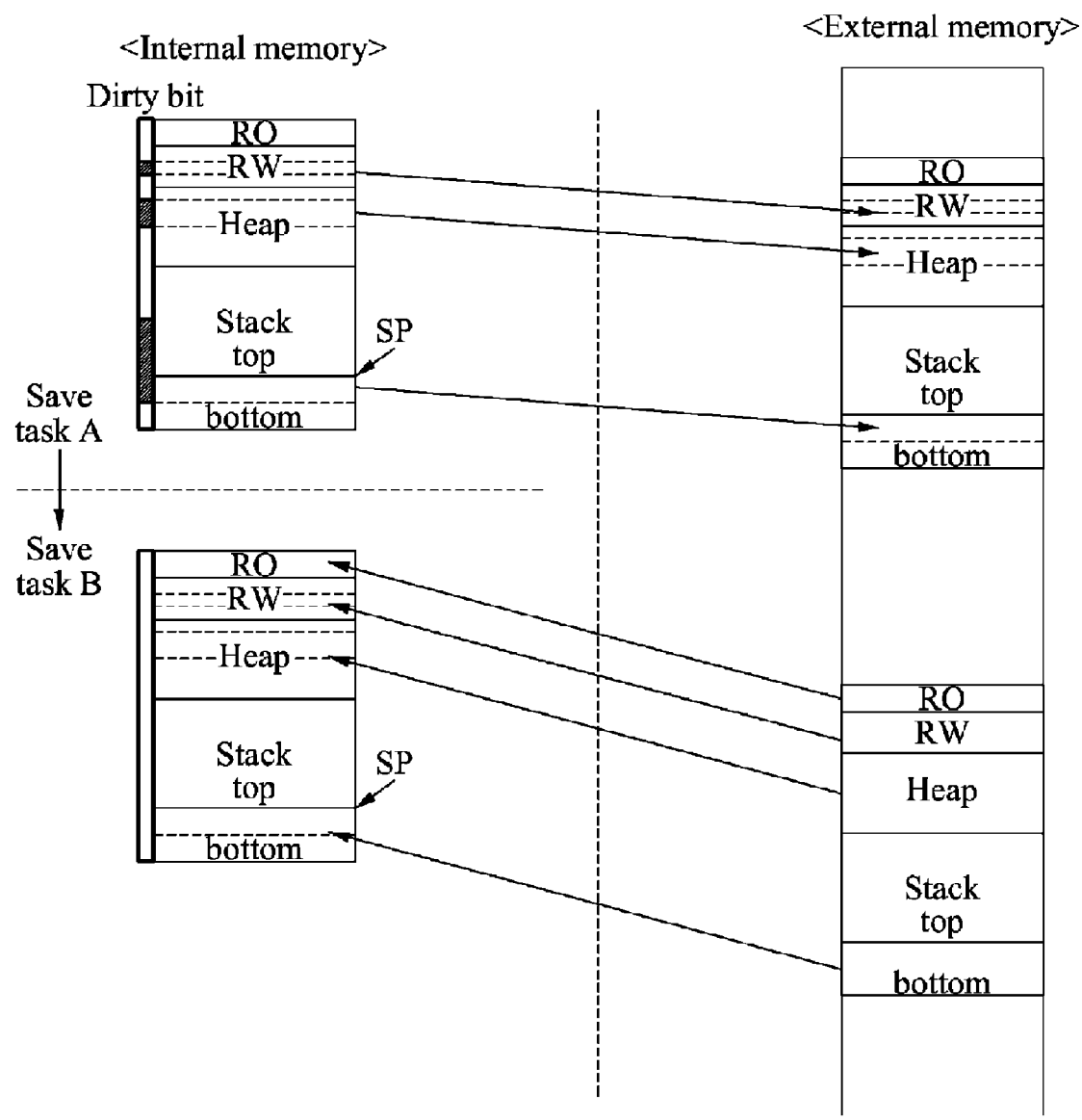
FIG. 3 illustrates a method of overlaying a data area of a task, according to example embodiments.

FIG. 3 illustrates a method of overlaying a data area of a task, according to example embodiments.

Referring to FIG. 3, an memory overlay apparatus according to the example embodiments may provide an internal memory with a dirty bit indicating a changed memory area so that only the data actually being used by the task is stored or restored, and may store only a portion which is changed during the overlay in an external memory.

According to an aspect, a stack area of the task may include an area from an address indicated by a stack pointer (SP) register during the overlay to a lowermost address to which the dirty bit is set in the stack area. The stack area may be stored from the internal memory to the external memory.

A stack of the task restored during the overlay may include an area from an address indicated by an SP register of a next task to a bottom of the stack, and may be restored from the external memory to the internal memory.

A current task area may store data from the internal memory to the external memory using the dirty bit.

A next task area, for example, an RO area, an RW area, and a heap area, may be completely restored from the external memory to the internal memory.

FIG. 4 illustrates an operational structure of a memory overlay apparatus according to example embodiments.

Referring to FIG. 4, the memory overlay apparatus may add a dirty bit to an internal memory, and set the dirty bit of an address in which data is to be stored to one, when a memory management unit commands storage of the data.

A DMA management unit may move a data area of a task between the internal memory and an external memory, in consideration of the dirty bit, when the task is changed.

FIG. 5 illustrates an example of a memory storage command according to example embodiments.

Referring to FIG. 5, when the memory storage command is stored in an internal memory, a code for setting a dirty bit of a corresponding address to one may be added to the memory storage command.

Figure 6:
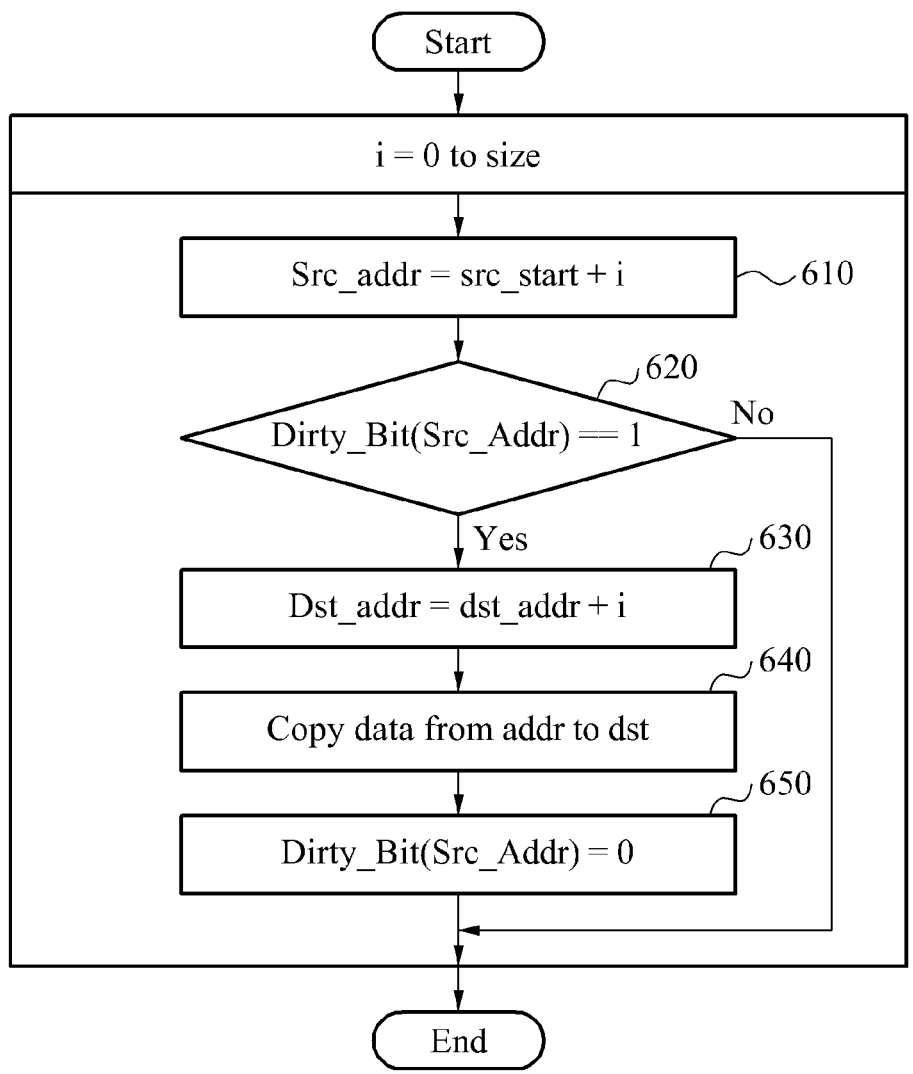
FIG. 6 illustrates an operational process of direct memory access (DMA), according to example embodiments.

FIG. 6 illustrates an operational process of DMA according to example embodiments.

Referring to FIG. 6, the memory overlay apparatus may additionally perform a DMA update function of performing DMA using a dirty bit.

A DMA management unit may perform DMA from an internal memory to an external memory such that only data of an address to which the dirty bit is set is copied to the internal memory.

As shown in operations 610, 620, 630, and 640 of FIG. 6, DMA update functions, that is, Src_addr, Size, and Dst_addr, of the DMA management unit may refer to functions of performing DMA from the internal memory to the external memory.

The DMA management unit may copy data as much as the Size from the Src_addr to the Dst_addr in operation 630, and copy only the data to which the dirty bit is set to the external memory in operation 640.

When the data is copied, the DMA management unit may initialize the dirty bit of the task of which the data is copied to zero, in operation 650.

Hereinafter, a memory overlay method according to example embodiments will be described.

FIG. 7 illustrates a memory overlay method according to example embodiments.

A memory overlay apparatus according to the example embodiments may store register data used by a task currently being performed when a context switch occurs, in operation 710.

The memory overlay apparatus may select a task to be performed next, in operation 720.

The memory overlay apparatus may copy a data area of the currently performed task from an internal memory to an external memory, in operation 730.

The memory overlay apparatus may initialize a dirty bit of an upper memory of an SP included in a stack area to zero, in operation 740.

The memory overlay apparatus may copy a data area of the task to be performed next from the external memory to the internal memory, in operation 750.

The memory overlay apparatus may restore register data of the task to be performed next, in operation 760.

The memory overlay apparatus may restore a program counter of the task to be performed next, in operation 770.

FIG. 8 illustrates a process of a context switch according to example embodiments.

Referring to FIG. 8, when a context switch occurs using a scheduler, a memory overlay apparatus according to the example embodiments may store contents of a register being used by a currently performed task, in operation 801.

The memory overlay apparatus may select a task to be performed next, in operation 802. In addition, the memory overlay apparatus may copy an RW area, a heap area, and a stack area of a data area of the currently performed task from an internal memory to an external memory using DMA update, in operations 803, 804, 805, and 806.

The memory overlay apparatus may initialize a dirty bit of an upper memory of an SP in case of the stack area to zero, in operation 807.

The memory overlay apparatus may copy a data area of the task to be performed next from the external memory to the internal memory using DMA, in operations 808, 809, 810, and 811.

The memory overlay apparatus may restore contents of a register of the task to be performed next and restore a program counter of the task to be performed next, in operation 812.

According to the example embodiments, a data area of a task may be efficiently managed in a computer system environment that uses an overlay scheme to share a small capacity internal memory.

Also, an overhead caused by memory copying during the memory overlay may be minimized.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A memory overlay apparatus comprising:
an internal memory comprising a dirty bit, which is updated in response to data of a first task being changed to indicate a changed memory area;
a memory management unit configured to control an external memory to selectively store the changed data of the first task; and
a direct memory access (DMA) management unit configured to check the dirty bit and to move the changed data of the first task corresponding to the dirty bit between the internal memory and the external memory, in response to a context switch,
wherein the DMA management unit is further configured to store a task stack area of the first task from the internal memory to the external memory
wherein the task stack area of the first task comprises a memory area from an address indicated by a stack pointer register of the first task to a lowermost address to which the dirty bit is set in a stack area,
wherein the DMA management unit is further configured to restore a task stack area of a second task from the external memory to the internal memory, and
wherein the task stack area of the second task comprises an area from an address indicated by a stack pointer register of the second task to an address of a bottom of the stack area.

2. The memory overlay apparatus of claim 1, wherein the changed data of the first task is stored from the internal memory to the external memory based on a value of the dirty bit.

3. The memory overlay apparatus of claim 1, wherein the task stack area of the second task, a read-only (RO) area, a read-write (RW) area, and a heap area, are restored from the external memory to the internal memory.

4. The memory overlay apparatus of claim 1, wherein the memory management unit sets the dirty bit of an address in which data is to be stored to a first state in response to a data storage command.

5. The memory overlay apparatus of claim 1, wherein the DMA management unit performs DMA such that only data of an address where the dirty bit is set is copied from the internal memory to the external memory.

6. The memory overlay apparatus of claim 5, wherein the DMA management unit sets the dirty bit of the address from which the data is copied to a second state in response to the data being copied.

7. The memory overlay apparatus of claim 1, wherein:
the dirty bit corresponds to a classified data area of the first task; and
the memory management unit controls the external memory to store only the changed data of the first task based on the dirty bit and a characteristic of the classified data area.

8. The memory overlay apparatus of claim 1, wherein the DMA management unit is further configured to disregard a read only data area of the first task during checking of the dirty bit and movement of the changed data of the first task corresponding to the dirty bit between the internal memory and the external memory.

9. A memory overlay method comprising:
maintaining, by a processor, an internal memory comprising a dirty bit indicating a changed memory area;
updating the dirty bit in response to data of a first task being changed to indicate the changed memory area
controlling an external memory to selectively store the changed data of the first task;
checking the dirty bit in response to a context switch; and
moving the changed data of the first task corresponding to the dirty bit between the internal memory and the external memory
wherein the moving comprises:
storing a task stack area of the first task from the internal memory to the external memory,
wherein the task stack area of the first task comprises a memory area from an address indicated by a stack pointer register of the first task to a lowermost address to which the dirty bit is set in a stack area,
wherein the checking comprises:
restoring a task stack area of a second task from the external memory to the internal memory, and
wherein the task stack area of the second task comprises an area from an address indicated by a stack pointer register of the second task to an address of a bottom of the stack area.

10. The memory overlay method of claim 9, further comprising setting the dirty bit of an address in which data is to be stored to a first state in response to a data storage command.

11. The memory overlay method of claim 9, further comprising performing direct memory access (DMA) such that only data of an address where the dirty bit is set is copied from the internal memory to the external memory.

12. The memory overlay method of claim 11, further comprising setting the dirty bit of the address from which the data is copied to a second state in response to the data being copied.

13. A memory overlay method comprising:
updating a dirty bit corresponding to data of a first task in response to the data of the first task of a currently performed task being changed;
storing register data being used by the first task in response to a context switch;
selecting a second task to be performed next;
selectively copying, by a processor, the changed data of the first task from an internal memory to an external memory;
initializing a dirty bit of an upper memory, corresponding to a stack pointer of the first task, to a first state;
copying a data area of the second task to be performed next from the external memory to the internal memory; and
restoring register data of the second task to be performed next
wherein the storing register data being used by the first task comprises:
storing a task stack area of the first task from the internal memory to the external memory,
wherein the task stack area of the first task comprises a memory area from an address indicated by a stack pointer register of the first task to a lowermost address to which the dirty bit is set in a stack area,
wherein the restoring comprises:
restoring a task stack area of the second from the external memory to the internal memory, and
wherein the task stack area of the second task comprises an area from an address indicated by a stack pointer register of the second task to an address of a bottom of the stack area.

14. The memory overlay method of claim 13, further comprising restoring a program counter of the second task to be performed next.

15. A non-transitory computer readable recording medium storing a program to cause a computer to implement the method of claim 9.

16. A multitasking system to manage sets of task data, each set associated with a respective task, the system comprising:
an internal memory comprising a plurality of data addresses configured to store data of a first task, wherein each address comprises a flag bit;
an external memory;
a direct memory access management unit configured to store the data of the first task from the internal memory to the external memory, and to restore data of a second task from the external memory to the internal memory; and
a memory management unit configured to initialize each flag bit to a first state in response to the data of the first task being stored, and to set the flag bit to a second state in response to the data task of the first being changed, by the respective task, in the data addresses in the internal memory,
wherein the direct memory access management unit is further configured to store a task stack area of the first task from the internal memory to the external memory
wherein the task stack area of the first task comprises a memory area from an address indicated by a stack pointer register of the first task to a lowermost address to which the flag bit is set in a stack area,
wherein the direct memory access management unit is further configured to restore a task stack area of the second task from the external memory to the internal memory, and
wherein the task stack area of the second task comprises an area from an address indicated by a stack pointer register of the second task to an address of a bottom of the stack area.

* * * * *